P. S. DEVLAN.
JOURNAL BOX LINING.
No. 66,472. Patented July 9, 1867.
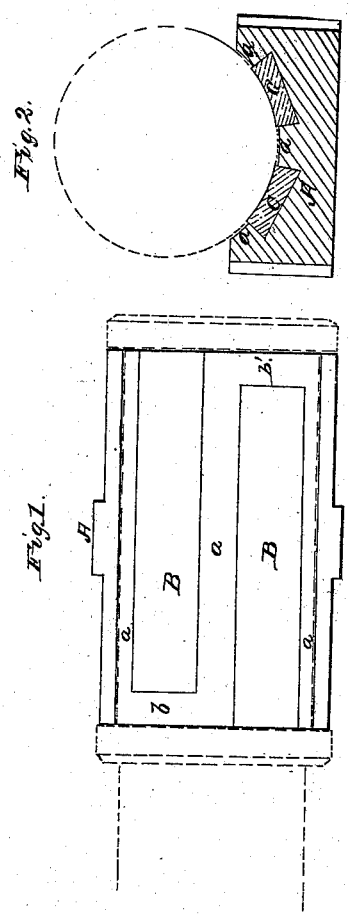

United States Patent Office.

P. S. DEVLAN, OF JERSEY CITY, NEW JERSEY.

*Letters Patent No. 66,472, dated July 9, 1867.*

IMPROVED LININGS FOR JOURNALS AND AXLE-BOXES.

*The Schedule referred to in these Letters Patent and making part of the same.*

TO ALL WHOM IT MAY CONCERN:

Be it known that I, P. S. DEVLAN, of Jersey City, in the county of Hudson, and State of New Jersey, have invented a certain new and useful improvement on Journal or Axle-Boxes or their linings, of which the following is a full, clear, and exact description, reference being had to the accompanying drawing, forming part of this specification, and in which—

Figure 1 represents a longitudinal section of a journal-box lining, or one portion of the same with my improvement applied to it, and Figure 2 a transverse section of the same.

Similar letters of reference indicate corresponding parts.

My invention consists in a novel construction of journal or axle-box or lining thereof, and arrangement in connection therewith, of strips of different material disposed in an intervening or intermediate manner, so as to form a portion of the bearing; but being of an anti-friction, absorbent, or lubricating character, in comparison with the harder material of which the box or lining-piece is composed, said strips being cast, slid, or otherwise fitted within the box or its lining, and so as to form end presentations on opposite sides or ends of the bearings, successively or alternately, to lubricate the shoulder and collar of the axle or shaft, and by which arrangement an end support is given to the strips against thrust of the shoulder or collar on them, and the construction of the box or lining materially strengthened.

Referring to the accompanying drawing, A is a journal-box, lining, or one part thereof, made, say, of ordinary metal. The construction of this lining is peculiar, it being formed internally with longitudinal ribs or bearing surfaces, $a$, joined at opposite ends by cross or connecting-strips or bearing surfaces, $b\ b'$, arranged to form closed ends on opposite sides or ends of the entire bearing to recesses $c\ c'$, by which construction considerable strength is given to the lining, and end bearings or supports provided, against pressure of the shoulder and collar of the shaft or axle, in its longitudinal play, on intervening or intermediate strips, B, slid, cast, or otherwise fitted to occupy the recesses $c\ c'$, and which may be made of soft Babbitt or other anti-friction metal, pasteboard steeped in petroleum, and hard-pressed, or other absorbent material that will serve to convey lubricating matter, and in this or their anti-friction property conspicuously differing from the hard or non-absorbent material of which the lining A is composed, said strips presenting alternately or successively end presentations on or at opposite ends of the general bearing, of which they form part, whereby they may serve to convey lubricating matter, whether derived as from within themselves or from a source connected with the box, to the shoulder and collar of the shaft or axle, as well as throughout the width of the bearing. A convenient way of fitting in these strips, the interior curvature of which should correspond to the rotundity of the shaft or axle, is to make the recesses $c\ c'$ of a dove-tail shape, and the strips B to correspond, whereby they are not only securely held, but may be slid in and out to facilitate renewal, the end strips $b\ b'$ restraining them, as before observed, from longitudinal or end play by thrust of the collar or shoulder of the axle or shaft, as well as strengthening the construction of the lining.

Of course the materials or compositions of which said strips are made may be varied, it only being necessary that they should possess the anti-friction or lubricating peculiarity mentioned, relatively to the material of which the lining itself is composed, nor do I restrict myself to any particular number, length, width, or thickness of such strips. By this construction of axle or journal-box, or its lining, increased durability is secured to the latter against wear in every direction, and a smoothness of run to the axle or shaft established.

What I here claim and desire to secure by Letters-Patent, is—

An axle or journal-box, or lining thereto, constructed substantially as described, with recesses open at their one, but closed at their opposite end, alternately, for the insertion of the anti-friction or lubricating material, essentially as herein set forth.

P. S. DEVLAN.

Witnesses:
J. W. COOMBS,
G. W. REED.